United States Patent [19]

Citrin

[11] 3,982,724
[45] Sept. 28, 1976

[54] DEFORMABLE TUBE MATERIAL DISPENSER

[75] Inventor: Paul S. Citrin, Danbury, Conn.

[73] Assignee: Indicon Inc., Danbury, Conn.

[22] Filed: Apr. 14, 1975

[21] Appl. No.: 568,123

[52] U.S. Cl. .................................. 251/7; 222/43; 222/46; 222/504; 222/511
[51] Int. Cl.² ............................................ F16K 7/06
[58] Field of Search ........... 222/504, 505, 212, 214, 222/513, 43, 46, 309, 387, 250; 251/7, 6

[56] References Cited
UNITED STATES PATENTS

| | | | |
|---|---|---|---|
| 2,305,840 | 12/1942 | Brown et al. | 251/7 X |
| 2,786,608 | 3/1957 | Brown | 222/504 X |
| 3,012,701 | 12/1961 | Weber | 251/7 |
| 3,075,551 | 1/1963 | Smith et al. | 251/7 X |
| 3,134,508 | 5/1964 | Bayer et al. | 222/309 X |
| 3,236,419 | 2/1966 | Remer et al. | 251/7 X |
| 3,292,824 | 12/1966 | Arp et al. | 222/250 |
| 3,461,805 | 8/1969 | Karkow | 222/309 X |

Primary Examiner—Allen N. Knowles
Attorney, Agent, or Firm—St. Onge Mayers Steward & Reens

[57] ABSTRACT

A material dispenser using a deformable tube through which the flow of material is controlled is described. The deformable tube is selectively mounted to expose a pinch region to a pressure element having a predetermined shape. The deformable tube is selectively supported to enable precise control over tube constriction for accurate material flow control. A micrometer stop is conveniently mounted to regulate the size of the tube restriction. Automatic and repeated actuation of the dispenser is obtained by locating the pressure element as a piston in a cylinder. Various deformable tube embodiments are described to reduce tube wall stresses for longer operating life and enable both positive closure and opening of the deformable tube.

11 Claims, 11 Drawing Figures

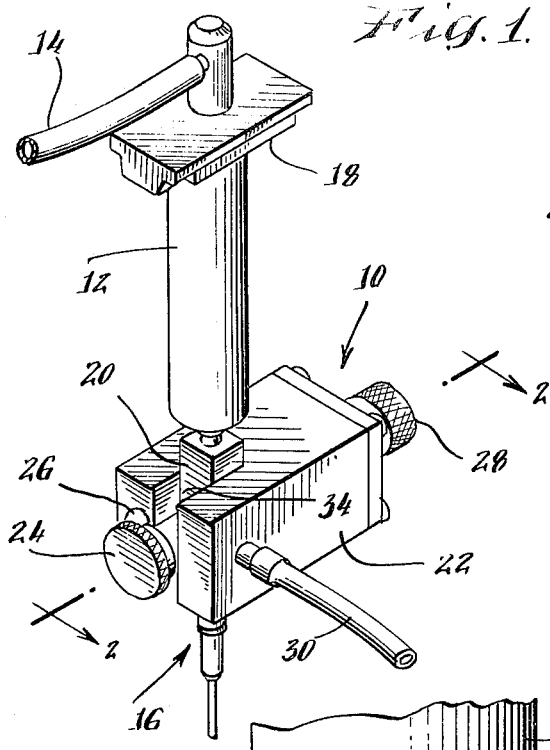
Fig. 1.
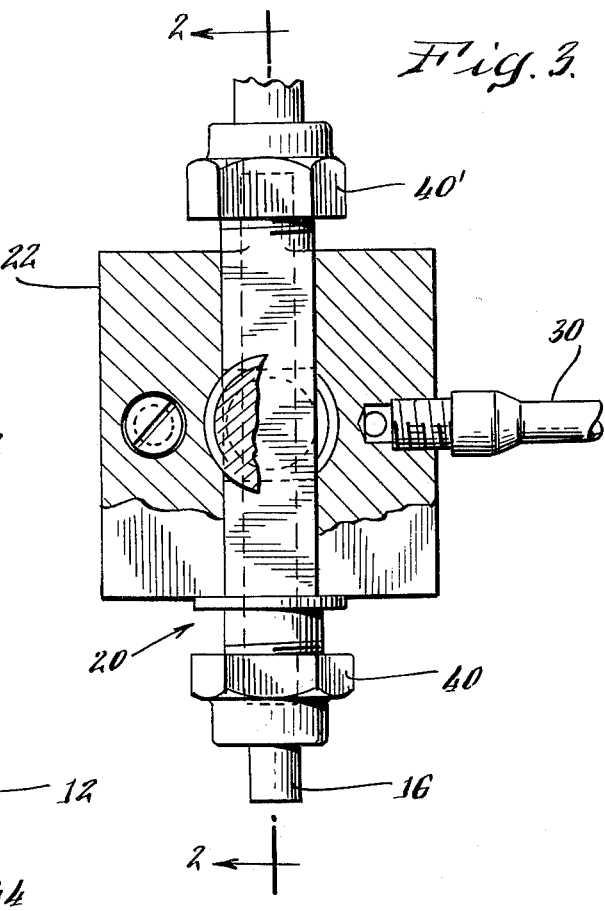
Fig. 3.
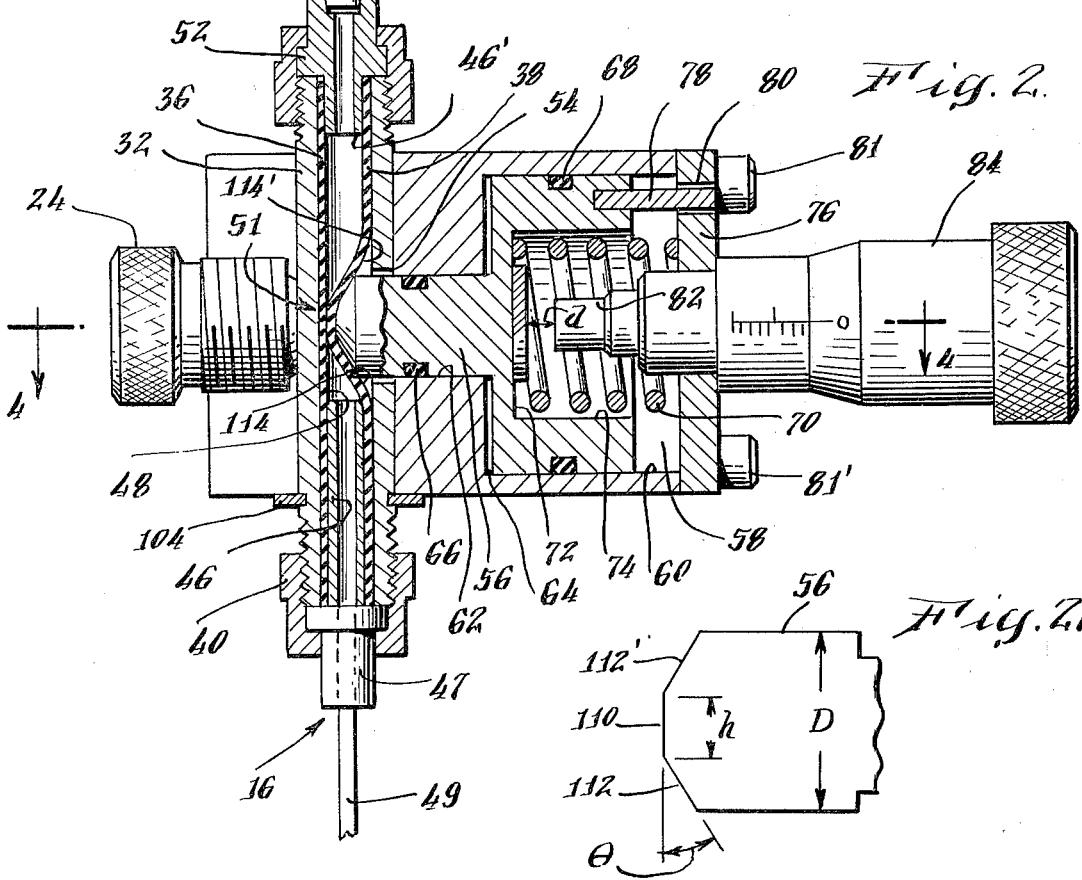
Fig. 2.
Fig. 2A.

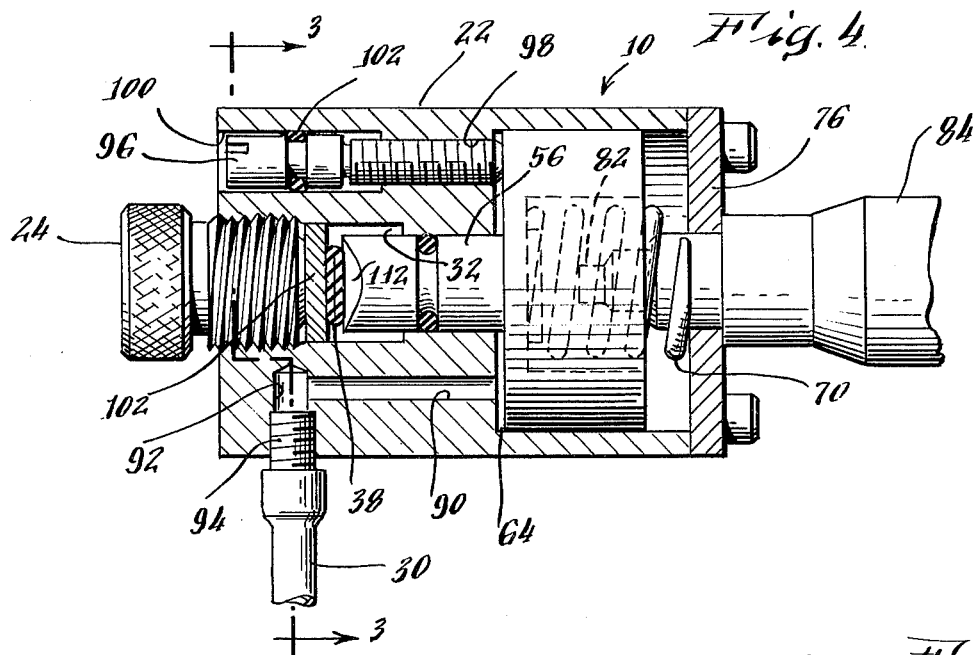
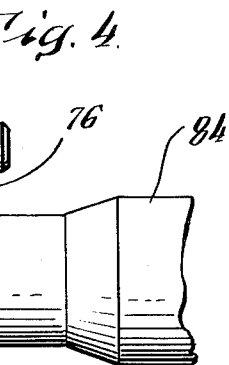
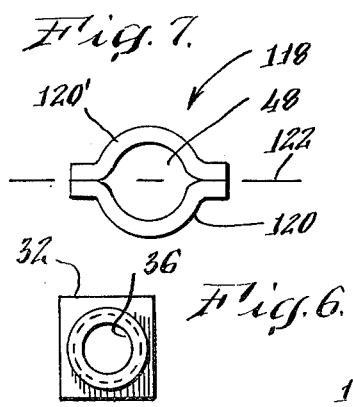
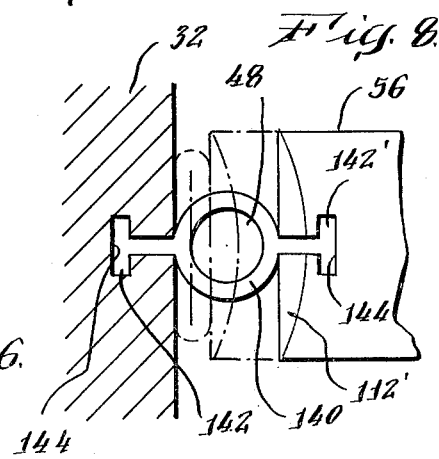
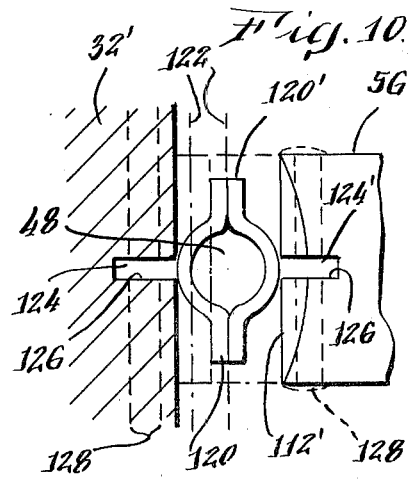
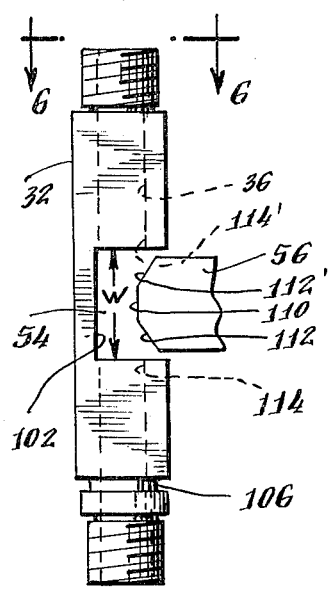
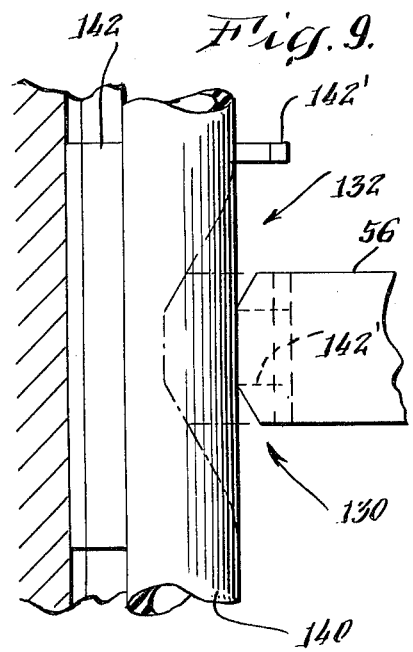
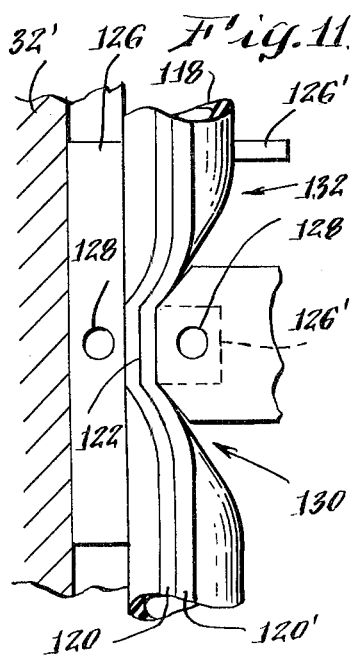

DEFORMABLE TUBE MATERIAL DISPENSER

This invention relates to a material dispenser. More specifically, this invention relates to a material dispenser wherein a deformable tube is used to control the dispensation of flowable materials passing through the tube.

BACKGROUND OF THE INVENTION

Dispensing devices are generally well known in the art. Note, for example, the patent to Moeller, U.S. Pat. No. 2,884,165 and the patent to Kishner, U.S. Pat. No. 3,679,331. In the Moeller patent a deformable tube is filled with a material to be dispensed. The tube is then pinched off from a source of supply and a movable platen is used to deform the tube and dispense the material. The length of stroke of the platen is controlled to regulate the amount of material to be ejected from the deformed tube.

In the patent to Kushner several differently sized deformable tubes are provided with fluid. Fluid in the tubes is dispensed by deforming the tubes with a plate actuated by a cam. Other dispensing apparatuses are described such as in the patents to Maclin, U.S. Pat. No. 3,684,408 and Allen et al., U.S. Pat. No. 3,308,898 with the latter describing use of a deformable tube to dispense a granular material.

The use of deformable tubes for dispensing material is particularly advantageous to prevent contamination and corrosive effects. It is desirable that deformable tubes dispense material in a constant manner. This is particularly important when small amounts are to be repetitively discharged.

The types of materials which may be dispensed can have a wide range of viscosities. The accuracy of the amount dispensed in some cases will tend to vary with viscosity. For example, when a low viscosity material is to be dispensed through a deformable tube in a highly precise manner, accurate control over the amount of deformation of the tube must also be maintained while the material is flowing.

A deformable tube metering valve generally relies upon the natural resilience of the tube material to provide the force needed to restore the tube to its natural state. However, certain materials may include adhesive characteristics which inhibit the restoration of the tube opening and thus impede the flow of material through the tube resulting in inaccuracies in the dispensation. In other instances an over-pinching of the deformable tube may result in impeding a restoration of the normal shape of the tube.

A conventional deformable tube has a cylindrical shape which is pinched in an area to restrict the tube opening. The pinching increases wall stresses, particularly when a complete tube restriction is needed to terminate flow of a low viscosity material. The wall stresses often lead to tube deterioration from fatigue when pinching takes place at the same place for repeated dispenser actuations. The result can be a perceptible drift in the accuracy of the material being dispensed and a subsequent loss of control over the process in which the deformable tube metering valve is employed.

SUMMARY OF THE INVENTION

In a dispenser in accordance with the invention, a deformable tube is employed which is deformed by a pressure element located so that the constriction of the tube occurs in a region where accurate control over the tube opening can be maintained.

As described with reference to one embodiment, control over the operative position of the pressure element is obtained with a conveniently located micrometer to adjust the size of the deformable tube opening through which material is to be dispensed.

The deformable tube is mounted in an assembly which is convenient to replace without disturbing the controls in the dispenser. The facility in tube replacement provides advantageous control over the surfaces to be wetted by the material being dispensed. Autoclaving and cleaning of components for medical dispensing applications may be conveniently carried out. A wide range of tube materials which are compatible with the material being dispensed can be used and quickly inserted when needed.

With a conveniently replaceable deformable tube material dispenser in accordance with the invention, a tube retainer is employed which receives and supports the tube in the vicinity of the tube's pinched region. The retainer has a side located opening to expose the tube for controlled deformation by a micrometer adjustable pressure element. The pressure element is selectively shaped to engage the tube across the retainer opening in a manner whereby the tube's deformation is carefully controlled to obtain an accurately repeatable dispensation of material.

In a deformable tube material dispenser in accordance with the invention, the tube's deformation is precisely repeatable over a wide range of material dispensing flow rates and can be conveniently controlled with automatic operating techniques. Highly viscous materials may be dispensed in precise small amounts by carefully controlling the volume change of the deformable tube.

With a deformable tube material dispenser in accordance with the invention, the restriction of the tube can be obtained with substantially reduced wall stresses for longer tube life.

For example, in one form for a deformable tube in accordance with the invention, a shape is employed whereby tube restriction occurs along a natural fold plane, thus substantially reducing wall stresses.

In conventional cylindrical deformable tubes, natural shape restoring forces are relied upon to open the tube. At times, for reasons of the stickiness of the material being dispensed, or the adherence of the internal tube walls, an inhibition of shape restoration occurs, thus reducing the cycling speed of the valve and affecting the accuracy of the amount of material being dispensed.

In another form for a deformable tube in accordance with the invention, the tube is provided with protrusions which can be positively engaged to force both the closure and the opening of the tube and thus avoid adherence problems between internal walls. An advantageously higher cycling rate may then be obtained.

It is, therefore, an object of the invention to provide a deformable tube material dispenser which is accurately controllable and convenient to use to dispense a wide range of materials. It is a further object of the invention to provide a deformable tube retainer assembly for convenient use and more accurate repeatable results in a material dispenser. It is still further an object of the invention to provide a deformable tube for use in dispensing material.

These and other advantages and objects of the invention can be understood with reference to the following description of several embodiments described in conjunction with the drawings.

BRIEF DESCRIPTION OF DRAWINGS

FIG. 1 is a perspective view of a metering valve in accordance with the invention;

FIG. 2 is a partial vertical central section view taken along the line 2—2 of FIG. 1;

FIG. 2A is an enlarged partial side view of a pressure element employed to deform a tube;

FIG. 3 is a section view of the metering valve taken along the line 3—3 shown in FIG. 4;

FIG. 4 is a section view of the metering valve taken along the line 4—4 shown in FIG. 2;

FIG. 5 is a side view of a deformable tube retainer used with the metering valve of this invention;

FIG. 6 is an end view of the deformable tube retainer taken along the line 6—6 of FIG. 5;

FIG. 7 is a cross-section view of a deformable tube for use with a metering valve in accordance with the invention;

FIG. 8 and FIG. 9 are respectively a cross-section and side elevation partial views of an alternate embodiment for a deformable tube in accordance with the invention; and FIG. 10 and FIG. 11 are respectively a cross-section and side elevational partial views of still another embodiment for a deformable tube in accordance with the invention.

DETAILED DESCRIPTION OF EMBODIMENT

With reference to FIG. 1, a material dispenser 10 is shown provided with a material reservoir 12 having a gas pressurizing line 14 to cause material to flow through the valve 10 to a nozzle 16. The pressurization of reservoir 12 is obtained with the use of a suitable controller (not shown). The controller also provides a time-controller pressure pulse at a controlled pressure level to the material dispenser 10. The design and structural features for the controller are well known and do not form a part of the invention. Suffice it to point out that the controller pressure pulse is selected commensurate with what is necessary to deliver the material in the reservoir 12 through a nozzle 16 which may be a hypodermic needle. A suitable removable pressure header 18 is shown connecting line 14 with reservoir 12 to enable the latter's replacement. The reservoir may be located remotely.

The material stored in reservoir 12 may be of a great variety such as a highly viscous grease or a low viscosity oil or water. Reservoir 12 is made of a material which is compatible with the material to be dispensed and has sufficient strength to enable pressurization for dispensing. Reservoir 12 has a bottom located discharge port 19 which is in communication with a deformable tube valve assembly 20 mounted to a metering valve housing 22 with a thumb screw 24.

The material dispenser 10 includes a tube clamping limit control screw 26 and a tube opening micrometer control 28. A gas pressure line 30 is shown connected to pneumatically actuate the dispenser 10 as will be further explained.

With reference to FIGS. 2, 3 and 4, further details of the dispenser 10 are shown. The deformable tube valve assembly 20 is shown including a valve retainer 32 formed of square metal stock to snugly fit within a correspondingly shaped slot 34 in valve housing 22. The retainer 32 has a through bore 36 sized to snugly receive a deformable tube 38 particularly on the downstream side. Ends of retainer 34 are threaded to receiver retainer nuts 40–40' which respectively hold nozzle 16 and a reservoir tube fitting 44. Both the nozzle 16 and the tube fitting 44 are provided with extensions 46–46' respectively which are inserted into bore 48 of deformable tube 38 to sealingly engage the internal wall of tube 38. Nozzle 16 is shown to include a holder 47 and needle tip 49. The extension 46 of nozzle holder 47 extends to support the inside of deformable tube 38 close to its pinch region 51. In effect, extension renders the tube 38 non-deformable below the pinch region to enhance deformation control. The extension 46 is further sized to clamp the tube 38 into retainer 32 to provide a leak-proof connection. Flanges such as 50–52 enable firm seating of the nozzle 16 and tube fitting 44.

Retainer 32 is provided with a side located opening 54 to expose a portion of the deformable tube 28 to a pressure element 56 in the form of a piston. The size of opening 54 is selected but slightly larger than piston 56 so that, as shown in FIG. 2, the deformed or pinched tube 38 can be laterally supported with a minimum bulging of tube 38.

Pressure element 56 is mounted in a two-part cylinder 58 formed of a bore 60 and counter bore 62. A pneumatic pressure chamber 64 is located between O seal rings 66–68 mounted on piston 56. A spring 70 is seated between the bottom 72 of a piston bore 74 and a removable cylinder cover 76. Spring 70 biases the pressure element 56 in a direction to normally cause a tube pinch or valve closure.

Since the piston 56 has a cylindrical shape, an anti-rotation pin 78 is press fit into a hole in an end of piston 56 and extends through a guide slot 80 in cover 76 above a cover holding screw 81 to maintain the orientation of piston 56 when it is reciprocated during operation. Slot 80 also serves to provide pressure relief during actuation of the piston 56.

Piston 56 is moved to a valve opening position by pressurizing chamber 64. The amount of the valve opening is determined by the distance $d$ between a movable stop 82 and bottom 72 in bore 74 of piston 56. The spacing $d$ is accurately controlled by forming stop 82 with a conventional micrometer 84 mounted to cover 76. The micrometer enables adjustment of the opening of the valve in small increments of the order of 0.0001 to 0.0003 inches.

In view of FIG. 4, pressure chamber 64 is shown in communication with gas inlet line 30 through suitable bores 90, 92 and a gas fitting 94. A pinch or valve closure control element 96 is shown in the form of a screw which engages a threaded bore 98 countersunk below a bore 100. The screw control 96 projects into pressure chamber 64 to serve as a closure stop for piston or pressure element 56. An O ring seal 102 is mounted in a suitable groove on screw control 96 to sealingly engage the wall of bore 100 throughout the length of travel of the control 96.

An advantageous feature of material dispenser 10 involves the use of a rapidly and conveniently replaceable deformable tube 38. The retainer 32, as shown in FIG. 2, has its through bore 36 sized to snugly and easily receive a deformable tube. As illustrated in FIGS. 4 and 5, the opening 54 is milled to a depth which is slightly below the circular wall of bore 36 to form an essentially flat anvil 102 against which tube 38 may be pinched as shown in FIG. 4.

Hence, when retainer 32 is inserted in slot 34 of valve housing 34 (see FIG. 1), care is taken to align the anvil 102 and opening 54 with the pressure element 56. For aid in this alignment, a retainer ring 104 (see FIGS. 2 and 3) is mounted in a groove 106 (see FIG. 5) of retainer 32 so that when the ring 104 contacts the bottom surface of housing 22, as shown in FIG. 3, the opening 54 is in precise alignment with pressure element 56. The application of thumb screw 24 to a partially threaded portion of slot 34 enables a firm clamping of the retainer against the housing 22.

The replacement of a deformable tube 38 may thus be quickly carried out by releasing thumb screw 24, sliding the deformable tube assembly out of slot 34 of the valve housing 22 and inserting a new tube 38 by releasing nuts 40–40'.

Such replacement may be desired when tube 38 is worn by repeated use or if a clean unused tube is needed. In instances where different tube materials need to be employed to prevent, for example, corrosive attack by the material being dispensed, the convenience of tube replacement can be appreciated.

The types of tubing which may be used can vary as desired. Deformable tubing formed of silicone elastomer, fluoro-silicone, butyl elastomer, poly-vinyl-chloride, or neoprene are examples of materials which can be used.

Generally the pinching action by the piston 56 is carefully controlled, preferably with a minimum pressure needed to establish the desired pinching force. The pinch control 96 provides a convenient method to limit the closure force of the valve to limit the amount of tube compression and wall sticking. With control 96 the corner stresses exerted on the round tubing 38 when it is deformed to the extent as shown in FIG. 4 can be reduced for longer operating life.

Another control applied to the pinching of the deformable tube involves the shaping of the contacting surface 110 of the pressure element 56 as shown in FIG. 2A. Tapered segments 112–112' are provided which extend away at predetermined angles $\theta$ from the main pinching surface 110. The tapered segments 112 provide support of the pinched tube 38 to prevent the latter from producing excessive bulges which would interfere with the size of the opening of tube 38 during operation of the valve.

The size of the angle $\theta$ for tapered segments 112 may vary with the type and size of deformable tubing 38. As an example, for a 3/16 inch outside diameter (O.D.) deformable tubing, an angle $\theta$ of about 30° has been found satisfactory for dispensing a wide range of materials.

The surface area and shape of the pinching surface 110 also has been found to affect control over the opening of the tube 38. Generally, a sharper surface reduces tube wall adherence effects such as when opposite internal walls stick to each other and fail to form an opening when the valve is operated. For a 3/16 inch O.D. tube 38, a contact surface 110, which is flat, and sized about 0.030 of an inch in height, $h$, has been found satisfactory.

The distance of the pinching surface 110 to the nearest lateral tube support places, such as 114–114' (see FIGS. 3 and 5) is preferably made as small as possible to maintain accurate control over the size of the opening of the tube 38 and minimize tube expansion. Hence, opening 54 in retainer 32 is made as small as is practical. Again, as an example for a 3/16 O.D. tube 38, a diameter, D, (see FIG. 2A) of piston 56 of about 5/16 of an inch has been found satisfactory with a retainer opening 54 being about ⅜ of an inch in width, W, (see FIG. 5).

Operation of the deformable tube material dispenser 10 is conveniently adaptable to an automatic pressure pulse generator. Thus a controller, not shown, produces a pressure pulse of predetermined duration into gas line 30 to drive pressure element 56 (see FIG. 4) away from tube 38.

The material in reservoir 12 may then flow, either under its own weight or with the aid of pressure applied to line 14 through the opening formed in tube 38 when the pressure in chamber 64 has driven the piston 56 against the micrometer stop 82.

Calibration of the metering valve 10 may be done by measuring the duration of a pressure pulse needed on control line 30, for a particular micrometer setting, to discharge a predetermined quantity of material. Fine control adjustments are available by varying the micrometer adjustment. Once the duration of the pressure pulse and the proper micrometer adjustment are determined, an accurate amount of material may be repeatedly dispensed.

For a highly viscous material, the dispenser may be effectively operated as an accurate pump. For example, the metering valve control gas line can be energized to open the tubing 38. The pressurized viscous material may then fill the entire tube 38 and nozzle 16 without being discharged by virtue of the material viscosity.

When the pressure on control line 30 is removed, the tube 38 is deformed with the pressure element 56 is returned to a tube pinch-off position by spring 70. This reduces the tube volume below the pinch region and causes a discharge of material commensurate with the change of volume. Since the deformation of the tube 38 can be accurately controlled with the micrometer adjustable stop 82 (see FIG. 2) and the pinch control 96 (see FIG.4), an accurate amount of viscous material may be repeatedly pumped out of the nozzle 16. It should be noted that the non-deformable internal support provided by nozzle extension 46 near the pinch region 51 is particularly helpful in controlling the accuracy of dispensing viscous materials.

The types of nozzles which may be used can vary as may appear desirable for the type of material being dispensed.

FIG. 7 shows an alternate shape for a deformable tube 118 which is formed of two generally semi-cylindrical segments 120–120'. Segments 120 are joined along a fold plane 122 by use of co-extrusion techniques or a suitable bonding or ultrasonic welding technique.

The advantage of the deformable tube 118 can be appreciated with reference to FIG. 10 where, in a pinched state, the segments 120 generally lie flat along the fold plane 122. In the pinched state, therefore, the tube 118 has a substantial reduction in wall stresses in comparison with conventional cylindrical tubing.

Although the shape of tube 118 is controlled to include a shape restoring force, this may not be sufficient to avoid adherence problems. Accordingly, the tube 118 is shown in FIGS. 10 and 11 provided with oppositely located protrusions 124–124' which are integrally connected to segments 120.

Protrusions 124 may be extruded with the tube segments 120 or separately attached thereto. The protrusions are sized to fit into correspondingly shaped slots 126 in tube retainer 32' and piston 56' for attachment by screws 128. In this manner both positive closing and opening of the deformable tube can be obtained.

Note in FIG. 11 that a portion of one tube protrusion 124' is cut away at 130 and 132 in the immediate vicinity below and above pressure element 56' to enable smooth pinching of tube 118 as shown.

FIGS. 8 and 9 illustrate another form for a deformable tube capable of positive closing and opening. A cylindrical deformable tube 140 is shown provided with protrusions 142–142' having dove-tailed shapes with T-shaped cross-sections. The protrusions 142 fit into correspondingly shaped slots 144 in retainer 32 and pressure element 56 to enable positive tube opening as well as closing of the tube.

Having thus described a deformable tube and metering valve in accordance with the invention, its advantages can be appreciated. Variations of the described embodiments may be accommodated. For example, the retainer 32 is shown formed of a single part; however, it can be made of three separate segments corresponding to an upper tube support, an intermediately located anvil and a lower tube support. In still another configuration, the pressure element may be located to operate directly against the lower tip of the deformable tube. In the latter case, the retainer need only provide an anvil and an upper tube support. The dispenser 10 has been described in conjunction with a normally pinched off valve. It should be understood, however, that the principles of this invention can be used with a normally open valve dispenser.

What is claimed is:

1. A material dispenser for dispensing flowable materials comprising
    a valve housing having a movable pressure element for control of the flow of material;
    a deformable tube valve assembly mounted to the valve housing, said deformable tube valve assembly having a deformable tube made of a material selected to enable repetetive tube constriction for control of the flow of material through the tube, said assembly further being provided with an opening sized to receive the pressure element and located to expose a pinch region of the deformable tube for constriction thereof, the valve assembly being selectively shaped to support the deformable tube in the vicinity of the pinch region to enable precise control of constriction of the tube by the pressure element active on the exposed pinch region of the tube;
    means for internally supporting the tube on the downstream side of the opening to render said tube effectively nondeformable on the downstream side of the pinch region; and
    a micrometer operatively located on the valve housing to contact the pressure element to limit movement thereof for control of the size of the opening of the tube at the exposed tube pinch region for corresponding control of the flow of material.

2. The material dispenser as claimed in claim 1 wherein the valve assembly is further provided with a substantially flat anvil located opposite the valve opening to provide an anvil surface against which the deformable tube may be pinched; and
    wherein the pressure element is provided with a pinching tip which is selectively shaped with a sharp flat contacting surface sized to engage the deformable tube across its width for pinching movement of the tube pinch region against the anvil surface, said pressure element pinching tip further having lateral surfaces oriented to support the tube pinch region engaged by the pinching tip for enhanced control of the deformation of the tube.

3. A material dispenser for dispensing flowable materials comprising
    a valve housing having a movable pressure element for control of the flow of material;
    a deformable tube assembly removably mounted to the valve housing, said assembly including a deformable tube through which material is dispensed and a deformable tube retainer shaped to circumferentially support the deformable tube, said retainer having an opening sized and located to receive the pressure element for pinching engagement with the deformable tube while maintaining adjacent lateral tube support;
    means for biasing the pressure element to pinch the deformable tube;
    variable means for limiting the pinching movement of the pressure element against the deformable tube;
    an internal support for the deformable tube, said internal support being mounted in said tube at the downstream side relative to said retainer opening to render the downstream segment of the tube effectively non-deformable for precision pinch control over said tube; and
    a micrometer stop control mounted to the valve housing to limit opening movement of the pressure element for regulation of the size of the opening of the deformable tube.

4. The material dispenser as claimed in claim 3 wherein
    said pressure element has a flat, sharply shaped tube engaging tip for enhanced control over deformation of the tube by the pressure element.

5. A material dispenser for dispensing flowable materials comprising
    a valve housing having a movable pressure element for control of the flow of material;
    said valve housing having a slot located opposite the movable pressure element;
    a deformable tube;
    retainer means for mounting the deformable tube and providing a tube exposed region for operative engagement by the pressure element to control the flow of material passing through the tube;
    said retainer means being sized to fit within said valve housing slot with the exposed tube region facing the movable pressure element;
    said retainer means further having a flat anvil located opposite said tube exposed region;
    said pressure element having a tube engaging tip of a predetermined flat and sharp shape selected to pinch a region of the deformable tube in a controlled manner against the flat anvil and
    means for releasably holding the retaining means in the valve housing slot.

6. The material dispenser as claimed in claim 5 wherein the tip of the pressure element is provided with a lateral surface oriented to support the deformed tube and inhibit uncontrolled bulging thereof.

7. The material dispenser as claimed in claim 6 wherein the retainer means includes means for internally supporting the deformable tube on the downstream side of the pinch region for enhanced control over the deformation of the tube.

8. The material dispenser as claimed in claim 7 wherein the retainer means supports the tube on opposite lateral sides of the pinched region and wherein the pressure element is provided with lateral surfaces to support the deformed tube towards said laterally supported sides of the pinched region.

9. The material dispenser as claimed in claim 8 and further including means for normally biasing the pressure element towards a tube pinching position; and
   a micrometer located to operatively limit opening movement of the pressure element and control the opening of the deformable tube.

10. The material dispenser as claimed in claim 9 and further including variable means for limiting pinching movement of the pressure element.

11. A material dispenser for flowable material comprising
   a valve housing and a pressure element mounted for movement in the valve housing and having a preselectively shaped tip;
   a tube retainer shaped to snugly receive and support the tube, said retainer having an intermediately located opening sized to receive a pressure element and located to expose an intermediate segment of the tube for constriction thereof, the retainer further being sized to provide circumferential support of the tube adjacent the opening to provide precise control of constriction of the tube by the pressure element active on the exposed segment of the tube, said tube retainer being releasably mountable on the valve housing with the intermediate tube segment located opposite the tip of the pressure element, said tube retainer being provided with a flat anvil at said intermediate tube segment with the tip of the pressure element being shaped with a sharp, flattened edge for pinching engagement with the deformable tube.

* * * * *